United States Patent Office 3,157,647
Patented Nov. 17, 1964

3,157,647
PROCESS FOR PRODUCING N-ALKYL AND N-ARALKYL THIADIAZINE COMPOUNDS
John T. Sheehan, Middlesex, and Harry Louis Yale, New Brunswick, N.J., assignors to Olin Mathieson Chemical Corporation, New York, N.Y., a corporation of Virginia
No Drawing. Filed Oct. 31, 1960, Ser. No. 65,935
8 Claims. (Cl. 260—243)

This application is a continuation-in-part of application, Serial No. 18,839, filed March 31, 1960, and now abandoned.

This invention relates to a new process for producing N-alkylated and N-aralkylated benzothiadiazine 1,1-dioxides or pyridothiadiazine 1,1-dioxides and to products produced by this process. More particularly, this invention relates to the conversion of compounds of the formula

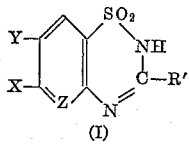

(I)

to alkylated or aralkylated compounds of the formula

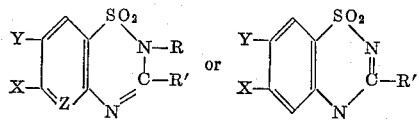

(II)      (III)

In the above formulas, the symbols have the following meanings: X represents hydrogen, halogen, alkyl, haloalkyl, alkoxy, alkylmercapto or cyano, Y represents sulfamyl and hydrogen, Z represents either carbon or nitrogen, R represents alkyl, aralkyl, halogen-, alkoxy-, alkylmercapto- or cyano-substituted alkyl and aralkyl groups containing halogen, alkyl, alkoxy, alkylmercapto or cyano groups on the ring, and R′ represents the same groups as R and hydroxy in addition.

The symbol X represents all four halogens. Alkyl groups represented by those symbols are preferably lower alkyl groups such as methyl, ethyl, propyl, isopropyl, butyl, isobutyl, t-butyl and the like. They may include, however, longer chain alkyl groups, e.g. up to about 15 carbon atoms, undecyl, for example. The haloalkyl groups are halogen substituted alkyl groups of the character described and include monohaloalkyl groups such as bromomethyl, chloroethyl and the like, as well as polyhalogenated radicals such as trifluoromethyl, trichloromethyl, tribromomethyl and the like. The alkoxy and alkylthio groups are ether groups containing preferably lower alkyl groups of the character described above. Alkyl groups represented by R and R′ are also preferably lower alkyl groups of the same type described above but may also include longer chain groups such as undecyl. The aralkyl groups are such lower alkyl groups which contain an aryl substituent, preferably phenyl, which may also contain on the ring substituents of the character already described.

The process which effects the conversion referred to above comprises reacting a compound of Formula I with a trialkylortho ester or a triaralkylortho ester in the absence of water at a temperature above 125° C. and lower than the temperature of pyrolysis of the reaction mixture. Preferably the reaction temperature lies within the range of about 130° to 160° C. An excess proportion of the trialkylortho ester or triaralkylortho ester alkylating agent is preferably used so that it also functions as the reaction medium. If, however, the benzothiadiazine 1,1-dioxide or pyridothiadiazine 1,1-dioxide is not appreciably soluble in the ortho ester, a non-hydroxylated solvent such as N,N-dimethylformamide may be used. A temperature above 125° C. is essential to effect the alkylation reaction desired. It is also essential to avoid the presence of water or a hydroxylated compound during the alkylation reaction in order that the product is not hydrolyzed in such a manner as to remove the substituent R.

The reaction of the benzothiadiazine 1,1-dioxide or pyridothiadiazine 1,1-dioxide with the alkylating agent results in a mixture of products alkylated either in the 2-position or in the 4-position. The mixture may be readily separated by conventional procedures such as fractional crystallization.

When Y represents the sulfamyl group, the reaction proceeds through novel intermediates which have the formulas

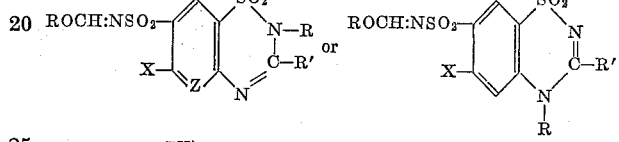

(IV)      (V)

The symbols have the same significance as above. These compounds may be separated from the reaction mixture and from each other by conventional procedures such as fractional crystallization.

Hydrolysis of the compound of Formula V, e.g. by boiling in an aqueous alcohol such as a lower alkanol like isopropanol, yields a compound of Formula III. Similar treatment of the intermediate of Formula IV opens the ring to provide a compound of the formula

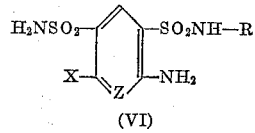

(VI)

which can then be cyclized, e.g. with an aldehyde of the formula R′—CHO such as phenylacetaldehyde, chloral and the like to yield an alkylated product of the formula

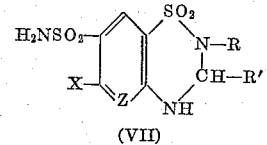

(VII)

The symbols have the same significance described previously. This provides a convenient method of forming compounds of Formula VII.

The class of ortho esters used as alkylating agents is a known class of compounds which may be prepared by reaction of an imino ether with the desired alcohol [Ber. 16, 352, 1643 (1883)], or by the exchange reaction between an alkyl ortho ester and the desired alcohol [J. Chem. Soc. 125, 1389 (1929)]. Ortho esters which may be used in the process of this invention have the formula $$(RO)_3C—R''$$

wherein R has the meaning already described and R″ represents hydrogen or alkyl. Such ortho esters include, for example, triethyl orthoformate, 3-chloropropyl orthopropionate, phenethyl orthobutyrate, tributyl orthoformate, 2-phenylhexyl orthobutyrate and the like.

Illustrative of the compounds of Formula I which may be alkylated are 1,2,4-benzothiadiazine 1,1-dioxide, 7-sulfamyl - 1,2,4-benzothiadiazine 1,1-dioxide, 6-chloro-7-sulfamyl-1,2,4-benzothiadiazine 1,1-dioxide, 3-methyl-7-sulfamyl - 1,2,4 - benzothiadiazine 1,1-dioxide, 6-trifluoromethyl-7-sulfamyl-1,2,4-benzothiadiazine 1,1-dioxide, 7-sulfamyl-1,2,4-pyridothiadiazine 1,1-dioxide and 6-methyl-7-sulfamyl-1,2,4-pyridothiadiazine 1,1-dioxide.

The products of the process described above, i.e. the compounds of Formulas II, III and VII, are physiologically active compounds exhibiting diuretic activity. They or their salts with alkali metals may be administered orally in conventional, pharmaceutically acceptable dosage forms, e.g. in the treatment of heart conditions such as congestive heart failure.

The following examples illustrate the invention. All temperatures are expressed in degrees centigrade.

EXAMPLE 1

*Ethylation of 6-Trifluoromethyl-7-Sulfamyl-1,2,4-Benzothiadiazine 1,1-Dioxide*

(a) A mixture of 30 g. of 6-trifluoromethyl-7-sulfamyl-1,2,4-benzothiadiazine 1,1-dioxide and 300 ml. of triethyl orthoformate are gradually heated by means of an oil bath maintained at 150–160°. A vigorous reaction occurs when the internal temperature reaches about 130° and a distillate, boiling range 50–80°, is collected. The internal temperature gradually rises and the reaction is complete when the internal temperature reaches about 150°. A clear solution is formed. On cooling the reaction mixture and filtering the solid which crystallizes, there is obtained 13.6 g. of 4-ethyl-6-trifluoromethyl-7-ethoxymethylene-sulfamyl-1,4,2-benzothiadiazine 1,1-dioxide (Compound A), M.P. about 179–180°. The filtrate from Compound A is concentrated in vacuo to give 20 g. of 2-ethyl-6-trifluoromethyl-7-ethoxymethylene-sulfamyl-1,2,4-benzothiadiazine 1,1-dioxide (Compound B), M.P. about 140–142°.

(b) Recrystallization of 13.6 g. of Compound A from boiling aqueous isopropanol gives 7.2 g. of 4-ethyl-6-trifluoromethyl-7-sulfamyl-1,4,2-benzothiadiazine 1,1-dioxide, M.P. about 279–280°.

(c) Recrystallization of 20 g. of Compound B from boiling aqueous isopropanol gives 16 g. 6'-ethylsulfamyl-α,α,α-trifluoro-4'-sulfamyl-m-toluidide, M.P. about 112–114°.

EXAMPLE 2

*Ethylation of 6-Trifluoromethyl-1,2,4-Benzothiadiazine 1,1-Dioxide*

A mixture of 19 g. of 6-trifluoromethyl-1,2,4-benzothiadiazine 1,1-dioxide and 150 ml. of triethyl orthoformate is heated for about three hours in a preheated oil bath at 150–155° and the reaction mixture is concentrated in vacuo. The residual oil crystallizes spontaneously. It is dissolved in 80 ml. of isopropanol and the solution is allowed to cool. The crystalline solid which separates is filtered (see below for filtrate) and weighs about 9.8 g. Trituration with 150 ml. of dry ether leaves behind 9.28 g. of solid, M.P. 146–148°. Recrystallization from isopropanol gives about 8.36 g. of 4-ethyl-6-trifluoromethyl-1,4,2-benzothiadiazine 1,1-dioxide. The original isopropanol filtrate is concentrated to dryness. The residue, about 9.5 g., is washed with dry ether to leave as insoluble about 1.9 g. of unreacted 6-trifluoromethyl-1,2,4-benzothiadiazine 1,1-dioxide. The ether washings are concentrated to give about 6.8 g. of solid, M.P. about 63–65°. This solid is extracted with 350 ml. of boiling ligroin and filtered from 0.26 g. of 4-ethyl-6-trifluoromethyl-1,4,2-benzothiadiazine-1,1-dioxide. The ligroin filtrate on cooling yields 4.5 g. of 2-ethyl-6-trifluoromethyl-1,2,4-benzothiadiazine 1,1-dioxide, M.P. about 71–73°.

EXAMPLE 3

*4-Ethyl-6-Trifluoromethyl-7-Sulfamyl-1,4,2-Benzothiadiazine 1,1-Dioxide, Sodium Salt*

To a solution of 3.6 g. of 4-ethyl-6-trifluoromethyl-7-sulfamyl-1,4,2-benzothiadiazine 1,1-dioxide in 50 ml. of absolute ethanol is added, dropwise, 10 ml. of a 1.0 M solution of sodium ethoxide in ethanol. Subsequently, the solution is concentrated to dryness in vacuo at room temperature to give a residual white powder which consists of the sodium salt of 4-ethyl-6-trifluoromethyl-7-sulfamyl-1,4,2-benzothiadiazine 1,1-dioxide.

EXAMPLE 4

*Ethylation of 3-Hydroxy-6-Trifluoromethyl-7-Sulfamyl-1,2,4-Benzothiadiazine 1,1-Dioxide*

A mixture of 5.7 g. of 3-hydroxy-6-trifluoromethyl-7-sulfamyl-1,2,4-benzothiadiazine 1,1-dioxide and 100 ml. of triethyl orthoformate is reacted as in Example 1 to give 4-ethyl-3-hydroxy-6-trifluoromethyl-7-ethoxymethylene-sulfamyl-1,4,2-benzothiadiazine 1,1-dioxide (Compound C) and 2-ethyl-3-hydroxy-6-trifluoromethyl-7-ethoxymethylenesulfamyl-1,2,4-benzothiadiazine 1,1-dioxide (Compound D). Recrystallization of Compound C from isopropanol gives 1.84 g. of 4-ethyl-3-hydroxy-6-trifluoromethyl-7-sulfamyl-1,4,2-benzothiadiazine 1,1-dioxide, M.P. about 258–259°. Recrystallization of Compound D gives 1.6 g. of 2-ethyl-3-hydroxy-6-trifluoromethyl-7-sulfamyl-1,2,4-benzothiadiazine 1,1-dioxide, M.P. about 282–284°.

EXAMPLE 5

*Methylation of 6-Trifluoromethyl-7-Sulfamyl-1,2,4-Benzothiadiazine 1,1-Dioxide*

By substituting 300 ml. of trimethyl orthoformate for the triethyl orthoformate in Example 1 and operating in a closed vessel at 150°, there is obtained 4-methyl-6-trifluoromethyl-7-methoxymethylenesulfamyl-1,4,2-benzothiadiazine-1,1-dioxide (Compound E) and 2-methyl-6-trifluoromethyl-7-methoxymethylenesulfamyl-1,2,4-benzothiadiazine 1,1-dioxide (Compound F). Recrystallization of Compound E from boiling aqueous ethanol gives 4-methyl-6-trifluoromethyl-7-sulfamyl-1,4,2-benzothiadiazine 1,1-dioxide, M.P. about 256–258°. Recrystallization of Compound F from boiling aqueous ethanol gives 6'-methylsulfamyl-α,α,α-trifluoro-4'-sulfamyl-m-toluidide, M.P. about 124–126°.

EXAMPLE 6

*Undecylation of 6-Trifluoromethyl-7-Sulfamyl-1,2,4-Benzothiadiazine 1,1-Dioxide*

By substituting undecyl orthohexanoate for the ethyl orthoformate in Example 1, there are obtained first 4-undecyl-6-trifluoromethyl-7-undecyloxymethylenesufamyl-1,4,2-benzothiadiazine 1,1-dioxide and 2-undecyl-6-trifluoromethyl-7-undecyloxymethylenesulfamyl-1,2,4-benzothiadiazine 1,1-dioxide. By recrystallization of each from boiling aqueous propanol, 4-undecyl-6-trifluoromethyl-7-sulfamyl-1,4,2-benzothiadiazine 1,1-dioxide and 6'-undecylsulfamyl-α,α,α-trifluoro-4'-sulfamyl-m-toluidide are obtained, respectively.

EXAMPLE 7

*Ethylation of 6-Chloro-7-Sulfamyl-1,2,4-Benzothiadiazine 1,1-Dioxide*

By substituting 6-chloro-7-sulfamyl-1,2,4-benzothiadiazine 1,1-dioxide for the 6-trifluoromethyl-7-sulfamyl-1,2,4-benzothiadiazine 1,1-dioxide in Example 1, there is obtained 4-ethyl-6-chloro-7-ethoxymethylenesulfamyl-1,4,2-benzothiadiazine 1,1-dioxide (Compound G), M.P. about 166–168°, and 2-ethyl-6-chloro-7-ethoxymethylene-sulfamyl-1,2,4-benzothiadiazine 1,1-dioxide (Compound H), M.P. about 112–114°. Recrystallization of Compound G from boiling aqueous isopropanol gives 4-ethyl-6-chloro-7-sulfamyl-1,4,2-benzothiadiazine 1,1-dioxide, M.P. about 275–277°, while recrystallization of Compound H gixes 6'-ethylsulfamyl-4'-sulfamyl-m-chloroanilide, M.P. about 97–99°.

EXAMPLE 8

*Ethylation of 7-Sulfamyl-1,2,4-Pyridothiadiazine 1,1-Dioxide*

By substituting 7-sulfamyl-1,2,4-pyridothiadiazine 1,1-dioxide for the 6-trifluoromethyl-7-sulfamyl-1,2,4-benzothiadiazine 1,1-dioxide in Example 1, there is obtained 4-ethyl-7-ethoxymethylenesulfamyl - 1,4,2 - pyridothiadiazine 1,1-dioxide (Compound I), M.P. about 145–147°, and 2-ethyl-7-ethoxymethylenesulfamyl - 1,2,4 - pyridothiadiazine 1,1-dioxide (Compound J), M.P. about 100–102°. Recrystallization of Compound I from boiling aqueous methanol gives 4-ethyl-7-sulfamyl-1,4,2-pyridothiadiazine 1,1-dioxide, M.P. about 266–267°, while recrystallization of Compound P from the same solvent gives 3-ethylsulfamyl-5-sulfamyl-2-aminopyridine.

EXAMPLE 9

*Ethylation of 3-Methyl-6-Trifluoromethyl-7-Sulfamyl-1,2,4-Benzothiadiazine 1,1-Dioxide*

By substituting 3-methyl-6-trifluoromethyl-7-sulfamyl-1,2,4-benzothiadiazine 1,1-dioxide for the 6-trifluoromethyl-7-sulfamyl-1,2,4-benzothiadiazine 1,1-dioxide in Example 1, there is obtained the 3-methyl derivatives (Compounds K and L) corresponding to Compounds A and B. Recrystallization of Compound K gives 3-methyl-4-ethyl-6-trifluoromethyl-7-sulfamyl - 1,4,2 - benzothiadiazine 1,1-dioxide while Compound L gives 6'-ethylsulfamyl-$\alpha,\alpha,\alpha$-trifluoro-4'-sulfamyl-m-toluidide.

EXAMPLE 10

*Butylation of 6-Methoxy-7-Sulfamyl-1,2,4-Benzothiadiazine 1,1-Dioxide*

A mixture of 10 g. of 6-methoxy-7-sulfamyl-1,2,4- benzothiadiazine 1,1-dioxide and 100 ml. of tributyl orthoformate are reacted as in Example 1 to give first the mixture of 4-butyl-6-methoxy-7-butoxymethylenesulfamyl-1,4,2-benzothiadiazine 1,1-dioxide and 2-butyl-6-methoxy-7-butoxy-methylenesulfamyl-1,2,4-benzothiadiazine 1,1-dioxide. The mixture is then dissolved in boiling aqueous n-propanol, cooled and the solid filtered to give 4-butyl-7-sulfamyl-1,4,2-benzothiadiazine 1,1-dioxide, the mother liquors are concentrated to one-half volume and cooled to give an additional amount of the same compound which is filtered. The filtrate is evaporated to dryness and the residue recrystallized from water to give 6'-butylsulfamyl-4'-sulfamyl-m-anisidine.

EXAMPLE 11

*Benzylation of 6-Methyl-7-Sulfamyl-1,2,4-Benzothiadiazine 1,1-Dioxide*

A mixture of 4.5 g. of 6-methyl-7-sulfamyl-1,2,4-benzothiadiazine 1,1-dioxide, 10 g. of tribenzyl orthoacetate and 50 ml. of N,N-dimethylformamide are heated as in Example 1; after three hours at 150–160°, the mixture is concentrated in vacuo to a small volume. The solid which separates slowly from the residual oil is fractionally crystallized from boiling aqueous isopropanol to give 4-benzyl-6-methyl-7-sulfamyl - 1,4,2 - benzothiadiazine-1,1-dioxide and 6'-benzylsulfamyl-4'-sulfamyl-m-toluidide.

EXAMPLE 12

*3-Benzyl-2-Ethyl-3,4-Dihydro-6-Trifluoromethyl-7-Sulfamyl-1,2,4-Benzothiadiazine 1,1-Dioxide*

A solution of 3.5 g. of 6'-ethylsulfamyl-$\alpha,\alpha,\alpha$-trifluoro-4-sulfamyl-m-toluidide, 1.83 g. of phenylacetaldehyde dimethyl acetal, 2.5 ml. of 10% aqueous hydrochloric acid and 25 ml. of 95% ethanol is refluxed for two hours to give 1.2 g. of 3-benzyl-2-ethyl-3,4-dihydro-6-trifluoromethyl-7-sulfamyl-1,2,4- benzothiadiazine 1,1-dioxide, M.P. about 110–112°.

EXAMPLE 13

*Ethylation of 6-Methylmercapto-1,2,4-Benzothiadiazine 1,1-Dioxide*

By substituting 6-cyano-7-sulfamyl-1,2,4-benzothiadiazine 1,1-dioxide for the 6-trifluoromethyl-7-sulfamyl-1,2,4-benzothiadiazine 1,1-dioxide in Example 1, there are obtained 4-ethyl-6-cyano-7-ethoxymethylenesulfamyl-1,4,2-benzothiadiazine 1,1-dioxide and 2-ethyl-6-cyano-7-ethoxymethylenesulfamyl-1,2,4-benzothiadiazine 1,1-dioxide; these, recrystallized from boiling aqueous isopropanol, give 4-ethyl-6-cyano-7-sulfamyl-1,4,2-benzothiadiazine 1,1-dioxide and 6'-ethylsulfamyl-4-sulfamyl-m-cyanoanilide.

6-cyano-7-sulfamyl-1,2,4-benzothiadiazine 1,1-dioxide is prepared by the following sequence of reactions:

(a) A mixture of 23.6 g. of 3-amino-benzonitrile, 11.9 g. of chlorosulfonic acid and 100 ml. of o-dichlorobenzene are refluxed for one hour, cooled, and the mixture poured into ice water to give 2-amino-4-cyanobenzenesulfonic acid.

(b) the 2-amino-4-cyanobenzenesulfonic acid, 10 g., and 40 ml. of chlorosulfonic acid are heated at 150° for three hours, cooled, 12.0 g. of thionyl chloride added, the mixture refluxed for two hours, cooled, and added dropwise to 200 ml. of ice-cooled concentrated aqueous ammonia, with stirring. Subsequently the mixture is heated for one hour on the steam bath, cooled, the solid filtered and dried. It is extracted first with 100 ml. of hot benzene, filtered and then recrystallized from water to give 4.2 g. of 3-amino-4,6-sulfamylbenzonitrile.

(c) The product from (b), 4.0 g., and 12 ml. of 98–100% formic acid are heated under reflux for two hours and cooled to give 6-cyano-7-sulfamyl-1,2,4-benzothiadiazine 1,1-dioxide.

EXAMPLE 14

*Ethylation of 6-Methylmercapto-1,2,4-Benzothiadiazine 1,1-Dioxide*

(a) Starting with 3-methylmercaptoaniline in place of the 3-aminobenzonitrile in Example 13(a), there is obtained 2-amino-4-methylmercaptobenzenesulfonic acid.

(b) The product from (a), 22.1 g., and 11.9 g. of chlorosulfonic acid are heated for three hours at 150° C., cooled and added slowly to 200 ml. of concentrated aqueous ammonia. The mixture is warmed to 60° for one hour, cooled, and the solid filtered to give 6-methylmercapto-1,2,4-benzothiadiazine 1,1-dioxide.

(c) The product from (b), 10.0 g. and 100 ml. of triethyl orthoformate are heated by an oil bath at 150° so that a distillate, 15 g., B.P. 50–80°, is collected in two hours. Workup of the reaction mixture as in Example 2 gives 2-ethyl-6-methylmercapto-1,2,4-benzothiadiazine-1,1-dioxide and 4-ethyl-6-methylmercapto-1,4,2-benzothiadiazine-1,1-dioxide.

EXAMPLE 15

*2-Ethyl-3-Trichloromethyl-6-Trifluoromethyl-7-Sulfamyl 1,2,4-Benzothiadiazine-1,1-Dioxide*

A mixture of 10.4 g. of 6'-(ethylsulfamyl)-4'-sulfamyl-$\alpha,\alpha,\alpha$-trifluoro-m-toluidine, 4.1 g. of chloral, 100 ml. of 95% ethanol and 10 ml. of 10% aqueous hydrochloric acid are heated under reflux for two hours and concentrated to half volume. On cooling the solution, 2-ethyl-3-trichloromethyl-6-trifluoromethyl - 7 - sulfamyl-1,2,4-benzothiadiazine 1,1-dioxide crystallizes and is isolated by filtration.

What is claimed is:

1. A process for the addition of an alkyl group of up to 15 carbon atoms to a nitrogen atom of the thiadiazine ring of a compound of the formula

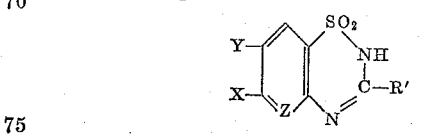

wherein X is a member of the group consisting of hydrogen, halogen, alkyl up to 15 carbon atoms, halo-lower alkyl, lower alkoxy, lower alkylmercapto and cyano, Y is a member of the group consisting of hydrogen and sulfamyl, Z is a member of the group consisting of carbon and nitrogen and R' is a member of the group consisting of hydroxy, alkyl up to 15 carbon atoms, R''''-phenyl lower alkyl, halo-lower alkyl, lower alkoxy-lower alkyl, lower alkylmercapto-lower alkyl, and cyano-lower alkyl, which comprises reacting said compound with an ortho acid ester of the formula

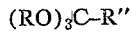

wherein R is a member of the group consisting of alkyl up to 15 carbon atoms, R''''-phenyl lower alkyl, R'''-alkyl wherein the alkyl has up to 15 carbon atoms and R''''-phenyl lower alkyl, R'' is a member of the group consisting of hydrogen, alkyl up to 15 carbon atoms and R'''-alkyl wherein the alkyl has up to 15 carbon atoms, R''' is a member of the group consisting of halogen, lower alkoxy, lower alkylmercapto and cyano, and R'''' is a member of the group consisting of halogen, alkyl up to 15 carbon atoms, lower alkoxy, lower alkylmercapto and cyano, at a temperature above about 125° C. in the absence of water.

2. A process as in claim 1 wherein the temperature is within the range of about 130° to 160° C.

3. A process for the addition of an alkyl group of up to 15 carbon atoms to a nitrogen atom of the thiadiazine ring of 6-trifluoromethyl-7-sulfamyl-1,2,4-benzothiadiazine 1,1-dioxides which comprises reacting said compounds with an alkyl ester of an ortho acid, said alkyl having up to 15 carbon atoms at a temperature above about 125° C. in the absence of water.

4. A process as in claim 3 wherein the temperature is within the range of about 130° to 160° C. and the ester is trialkyl orthoformate.

5. A process which comprises reacting a 7-sulfamyl-1,2,4-benzothiadiazine 1,1-dioxide with a trialkyl orthoformate, said alkyl having up to 15 carbon atoms, at a temperature above about 125° C. in the absence of water and hydrolyzing the reaction product.

6. A process for the addition of an alkyl group of up to 15 carbon atoms to a nitrogen atom of the thiadiazine ring of 7-sulfamyl-1,2,4,-pyridothiadiazine 1,1-dioxides which comprises reacting said compounds with an alkyl ester of an ortho acid, said alkyl having up to 15 carbon atoms, at a temperature above about 125° C. in the absence of water.

7. A process as in claim 6 wherein the temperature is within the range of about 130° to 160° C. and the ester is trialkyl orthoformate.

8. A process for the production of 4-ethyl-7-sulfamyl-1,4,2-pyridothiadiazine 1,1-dioxide which comprises reacting 7-sulfamyl-1,2,4-pyridothiadiazine 1,1-dioxide with ethyl orthoformate at a temperature above about 125° C. in the absence of water.

References Cited in the file of this patent

UNITED STATES PATENTS 3,060,178    Ziegler  ---------------- Oct. 23, 1962

OTHER REFERENCES

Jour. Amer. Med. Assoc., page 466, May 25, 1958, Call No. R11 A5.

Roberts et al., Jour. Amer. Chem Soc., vol. 78, pages 4778–4781 (1956).